United States Patent [19]

Okuyama et al.

[11] Patent Number: 5,708,413

[45] Date of Patent: Jan. 13, 1998

[54] HEAD-UP DISPLAY APPARATUS

[75] Inventors: Hideki Okuyama, Oobu; Yasuo Hagisato, Susono; Kohichi Murata; Hiromi Sakurai, both of Yokohama, all of Japan

[73] Assignees: Nippondenso Co., Ltd., Kariya; Asahi Glass Co., Ltd., Tokyo; Toyota Jidosha Kabushiki Kaisha, Toyota, all of Japan

[21] Appl. No.: 649,513

[22] Filed: May 17, 1996

[30] Foreign Application Priority Data

May 18, 1995 [JP] Japan ................ 7-119861
Mar. 18, 1996 [JP] Japan ................ 8-061164

[51] Int. Cl.$^6$ ................ B60Q 1/00; G09F 9/00
[52] U.S. Cl. ................ 340/461; 340/980; 359/630; 345/7
[58] Field of Search ................ 340/461, 980, 340/961; 359/630; 345/7, 8, 9

[56] References Cited

U.S. PATENT DOCUMENTS

| | | |
|---|---|---|
| 4,763,990 | 8/1988 | Wood ................ 345/7 |
| 4,832,427 | 5/1989 | Nanba et al. ................ 350/3.72 |
| 4,908,611 | 3/1990 | Iino ................ 359/630 X |
| 5,303,085 | 4/1994 | Rallison ................ 359/631 |
| 5,506,595 | 4/1996 | Fukano et al. ................ 359/630 X |

FOREIGN PATENT DOCUMENTS

| | | |
|---|---|---|
| 2-011730 | 1/1990 | Japan . |
| 3-091233 | 9/1991 | Japan . |
| 5-000424 | 1/1993 | Japan . |
| 5-124456 | 5/1993 | Japan . |
| 94/14098 | 6/1994 | WIPO . |

Primary Examiner—Jeffery Hofsass
Assistant Examiner—Anh La
Attorney, Agent, or Firm—Cushman, Darby & Cushman IP Group of Pillsbury Madison & Sutro LLP

[57] ABSTRACT

Liquid crystal display 1 has a surface disposed in parallel with a surface of holographic concave mirror 2. Liquid crystal display 1 causes a revolution about a display center "d" of holographic concave mirror 2 in a back-and-forth direction as indicated by arrow α. In response to such revolution around holographic concave mirror 2, liquid crystal display 1 causes an autorotation about its vertical center "e" in the back-and-forth direction as indicated by arrow β.

5 Claims, 5 Drawing Sheets

HEAD-UP DISPLAY APPARATUS

BACKGROUND OF THE INVENTION

1. Field of the Invention

This invention relates to an improvement of a head-up display apparatus.

2. Related Art

A conventional head-up display apparatus is, for example, incorporated in an automotive vehicle, as shown in FIG. 5. Such a head-up display apparatus generally comprises a display element 1 and a light source 4. Light source 4 is disposed behind display element 1, so that light emitted from light source 4 enters into and passes through display element 1 from the rear side to the front side of the display element 1.

Image of display element 1, formed by irradiating light from behind display element 1, is successively reflected by reflection plates 5 and 8 sequentially disposed in this order and is then projected on a holographic concave mirror 7. The image, enlarged through holographic concave mirror 7, is projected on a reflection plate (i.e. a combiner) 2 provided on a windshield, thereby forming an enlarged image 8 of display element 1 at a position ahead of the windshield.

In this kind of head-up display apparatus having the arrangement above-described, various attempts will be feasible to reduce the size of a main body 10. Main body 10 accommodates display element 1, light source 4, reflection plates 5, 6, and holographic concave mirror 7 therein.

One method for reducing the size of main body 10 is to increase the enlargement ratio of holographic concave mirror 7, because the optical path length (a+b+c) can be shortened with increasing enlargement ratio of holographic concave mirror 4. However, the enlargement ratio of holographic concave mirror 4 is normally unable to increase so freely and is rather limited within a relatively narrow range. Hence, an idea of setting a short optical path by increasing the enlargement ratio of holographic concave mirror 7 will be difficult to practically realize. Thus, the downsizing of main body 10 will not be attained by this method.

Another method for realizing the size reduction of the head-up display apparatus is to replace holographic concave mirror 7 by an ordinary reflection plate while constituting reflection plate 2 by holographic concave mirror. According to this method, the optical path length from holographic concave mirror 2 to display element 7 can be certainly increased by an amount equivalent to an optical path length "d" between holographic concave mirror 2 and reflection plate 7. Elongating the optical path length in this manner is desirable in realizing an effective downsizing of main body 10, since the optical path length (a+b+c) inside main body 10 can be reduced correspondingly.

However, the above-described methods are fundamentally based on a "single viewpoint" where a point of view is fixed at a predetermined position. According to such "single viewpoint", the enlarged image 8 will not cause distortion only when the display element 1 is correctly disposed perpendicularly to the optical axis "L".

In addition, however, it is customary for a driver to move his/her head or the height of different drivers' eyes varies in accordance with each driver's physical size or features. In such cases, the spatial relationship between display element 1 and holographic concave mirror 7 may be so widely changed that the resultant enlarged image 8 is significantly distorted.

SUMMARY OF THE INVENTION

Accordingly, in view of above-described problems encountered in the related art, a principal object of the present invention is to provide a novel and excellent head-up display apparatus which is capable of forming an enlarged image of a display element free from distortion regardless of changes in the viewpoint of an observer.

In order to accomplish this and other related objects, a first aspect of the present invention provides a novel and excellent head-up display apparatus comprising a light source for emitting light, a display element disposed on an optical axis of the light source for forming an image of the display element by the light emitted from the light source, and a reflection plate for enlarging the image of the display element. According to the first aspect of the invention, the head-up display apparatus is characterized in that a first angle between the optical axis and a surface of the display element is identical with a second angle between the optical axis and a surface of the reflection plate.

According to features of preferred embodiments of the present invention, the display element is rotatable about a predetermined display center of the reflection plate, thereby causing a revolution of the display element around the reflection plate. Meanwhile, the display element is rotatable about a vertical center thereof so as to cause an autorotation. The display element causes the autorotation in response to the revolution around the reflection plate in such a manner that the first angle increases in accordance with an increase of the second angle. The display element is rotatable about a predetermined rotational center spaced from the display element so as to cause the autorotation.

Furthermore, a second aspect of the present invention provides a head-up display apparatus comprising a light source for emitting light, a display element disposed on an optical axis of the light source for forming an image of the display element by the light emitted from the light source, and a reflection plate for enlarging the image of the display element, and characterized in that the display element is rotatable about a predetermined rotational center located at a display center of the reflection plate, thereby causing a revolution of the display element around the reflection plate.

According to features of preferred embodiments of the present invention, the display element is rotatable about a vertical center thereof so as to cause an autorotation.

Moreover, a third aspect of the present invention provides a head-up display apparatus comprising a light source for emitting light, a display element disposed on an optical axis of the light source for forming an image of the display element by the light emitted from the light source, and a reflection plate for enlarging the image of the display element, and characterized in that the display element is rotatable about a predetermined rotational center located behind the display element.

According to features of preferred embodiments of the present invention, the display element causes an autorotation in response to a revolution around the reflection plate in such a manner that a first angle increases in accordance with an increase of a second angle, where the first angle is an angle between the optical axis and a surface of the display element while the second angle is an angle between the optical axis and a surface of the reflection plate. And, the display element is rotatable about a vertical center thereof so as to cause an autorotation.

In a preferable mode, the reflection plate is a holographic concave mirror and the display element is a liquid crystal element.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENTS

Figure 1:
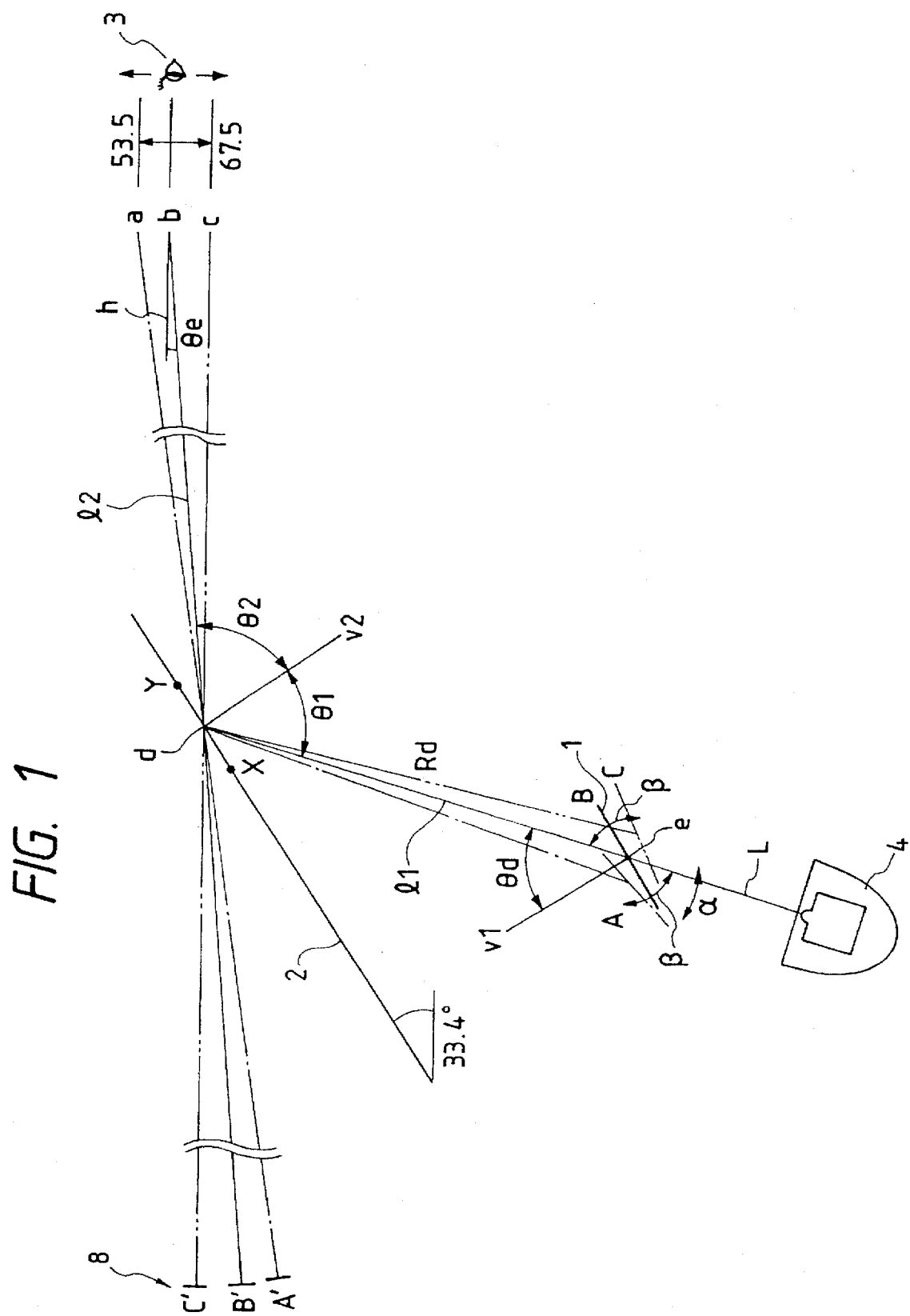
FIG. 1 is a schematic view showing an arrangement of a head-up display apparatus in accordance with a first embodiment of the present invention.

Preferred embodiments of the present invention will be explained in greater detail hereinafter, with reference to the accompanying drawings. Identical parts are denoted by the same reference numeral throughout views.

First Embodiment

FIG. 1 is a schematic view showing an arrangement of a head-up display apparatus in accordance with the first embodiment of the present invention.

In FIG. 1, reference numeral 1 represents a liquid crystal display, and reference numeral 2 represents a holographic concave mirror. Liquid crystal display 1 serves as a display element of the present invention. Holographic concave mirror 2 is inclined toward the viewpoint of an observer 3 (e.g. a driver of an automotive vehicle) at a predetermined angle, e.g. 33.4°, with respect to a horizontal line. Holographic concave mirror 2 acts as a reflection plate of the present invention for displaying an enlarged image 8 of liquid crystal display 1.

Reference numeral 4 represents a light source, and "L" represents an optical axis of light source 4.

Liquid crystal display 1 is aligned with respect to holographic concave mirror 2 in such a manner that the display surface of liquid crystal display 1 is substantially parallel to the surface of holographic concave mirror 2.

Liquid crystal display 1 is displaceable or rotatable about a display center "d" of holographic concave mirror 2 as shown by an arrow "α". In other words, liquid crystal display 1 causes a revolution about display center "d" of holographic concave mirror 2. Furthermore, liquid crystal display 1 is rotatable about its vertical center "e", as shown by an arrow "β". In other words, liquid crystal display 1 causes an autorotation about its vertical center "e" in a back-and-forth direction.

A revolution angle "θ1" of liquid crystal display 1 is defined as an angle between a straight line "v2" and a straight line "11". Straight line "v2" is perpendicular to the surface of holographic concave mirror 2, while straight line "11" connects the vertical center "e" of liquid crystal display 1 and the display center "d" of holographic concave mirror 2.

An autorotation angle "θd" of liquid crystal display 1 is defined as an angle between a straight line "v1" and straight line "11". Straight line "v1" is perpendicular to the display surface of liquid crystal display 1.

Both revolution angle θ1 and autorotation angle θd are determined in accordance with the height of eyes of the observer 3, on the basis of simulation results.

The following table 1 shows practical data of revolution angle θ1 and autorotation angle θd.

TABLE 1

| EYE POSITION (mm) | θe (°) | θ2 (°) | Rd (mm) | θ1 (°) | θd (°) | DISPLAY ELEMENT 1 | ENLARGED IMAGE |
|---|---|---|---|---|---|---|---|
| a +53.5 | 9.4 | 66.0 | 259 | 52.4 | 60 | A | A' |
| b | 5.9 | 62.5 | 259 | 50 | 50 | B | B' |
| c −67.5 | 1.4 | 58.0 | 259 | 46.7 | 40 | C | C' |

In the table 1, "b" represents a midpoint of the eyes of the observer 3, "a" represents an eye position higher than the midpoint "b" by an amount of 53.5 mm, and "c" represents another eye position lower than the midpoint "b" by an amount of 67.5 mm. "θe" represents an angle between a straight line "12" and a horizontal line "h". Straight line "12" connects the midpoint "b" of the eyes of observer 3 and the display center "d" of holographic concave mirror 2. "θ2" represents an angle between the straight line "v2" and the straight line "12". Straight line "v2" is perpendicular to holographic concave mirror 2. "Rd" represents a distance from the display center "d" of holographic concave mirror 2 to the vertical center "e" of liquid crystal display 1.

Through experiments, it was confirmed that the setting revolution angle θ1 and autorotation angle θd of liquid crystal display 1 in accordance with the data shown in table 1 could realize the enlarged images A', B' and C' free from distortion. Enlarged images A', B' and C' are enlarged images of liquid crystal display 1 corresponding to eye positions "a", "b" and "c", respectively.

As explained above, the first embodiment of the present invention makes it possible to reduce the optical path length "Rd" between holographic concave mirror 2 and liquid crystal display 1, since the holographic concave mirror 2 acting as a reflection plate of the present invention has a significant enlargement ratio. Hence, satisfactory downsizing of the head-up display can be realized.

Furthermore, as liquid crystal display 1 can cause both revolution and autorotation, it becomes possible to obtain enlarged images A', B' and C' free from distortion even if the viewpoint is variable in a predetermined eye range.

Observer 3 adjusts both of revolution angle θ1 and autorotation angle θd of liquid crystal display 1 in accordance with the height of his/her eyes through an angular adjusting device (not shown). When a plurality of observers use this head-up display apparatus, revolution angle θ1 and autorotation angle θd of liquid crystal display 1 are adjusted in accordance with the height of each observer so as not to cause undesirable distortion of the display image.

Even after revolution angle θ1 and autorotation angle θd of liquid crystal display 1 are changed through the angular adjusting device, the relationship between the angle of liquid crystal display 1 and the angle of holographic concave mirror 2 with respect to the optical axis L is maintained in the following manner.

When liquid crystal display 1 causes a revolution increasing the angle between holographic concave mirror 2 and optical axis L, the angle between liquid crystal display 1 and optical axis L is increased correspondingly.

When the incident angle of the light emitted from light source 4 is increased with respect to holographic concave mirror 2, i.e. when liquid crystal display 1 is positioned at a position "A", the enlargement ratio of holographic concave mirror 2 is reduced at the near side "X" compared with the far side "Y" of holographic concave mirror 2.

However, this change can be corrected by the increase of angle between liquid crystal display 1 and optical axis L, because such rotation increases the distance between holographic concave mirror 2 and liquid crystal display 1 at the near side "X". Thus, the enlargement ratio can be maintained at substantially the same value regardless of the position of liquid crystal display 1 with respect to holographic concave mirror 2, thereby always obtaining the enlarged display image free from distortion.

Furthermore, as liquid crystal display 1 causes a revolution about display center "d" of holographic concave mirror 2, the optical axis center is always fixed at display center "d" on holographic concave mirror 2 so as to correspond to liquid crystal display 1 even if the height of eyes of observer 3 varies in the range of "a" to "c", i.e. even if the incident angle θ1 changes significantly.

Holographic concave mirror 2 possesses a desired enlargement ratio only when holographic concave mirror 2 is placed at a predetermined position with a predetermined angle. Accordingly, always coinciding the optical axis center with display center "d" of holographic concave mirror 2 makes it possible to suppress the change of enlargement ratio at minimum even if the incident angle θ1 of the light to holographic concave mirror 2 is changed.

In this manner, the first embodiment of the present invention can suppress the change of enlargement ratio within a narrow and allowable range regardless of the height of eyes of observer 3, i.e. when the eye height varies in the range of "a" to "c", obtaining enlarged images free from distortion.

Second Embodiment

Figure 2:
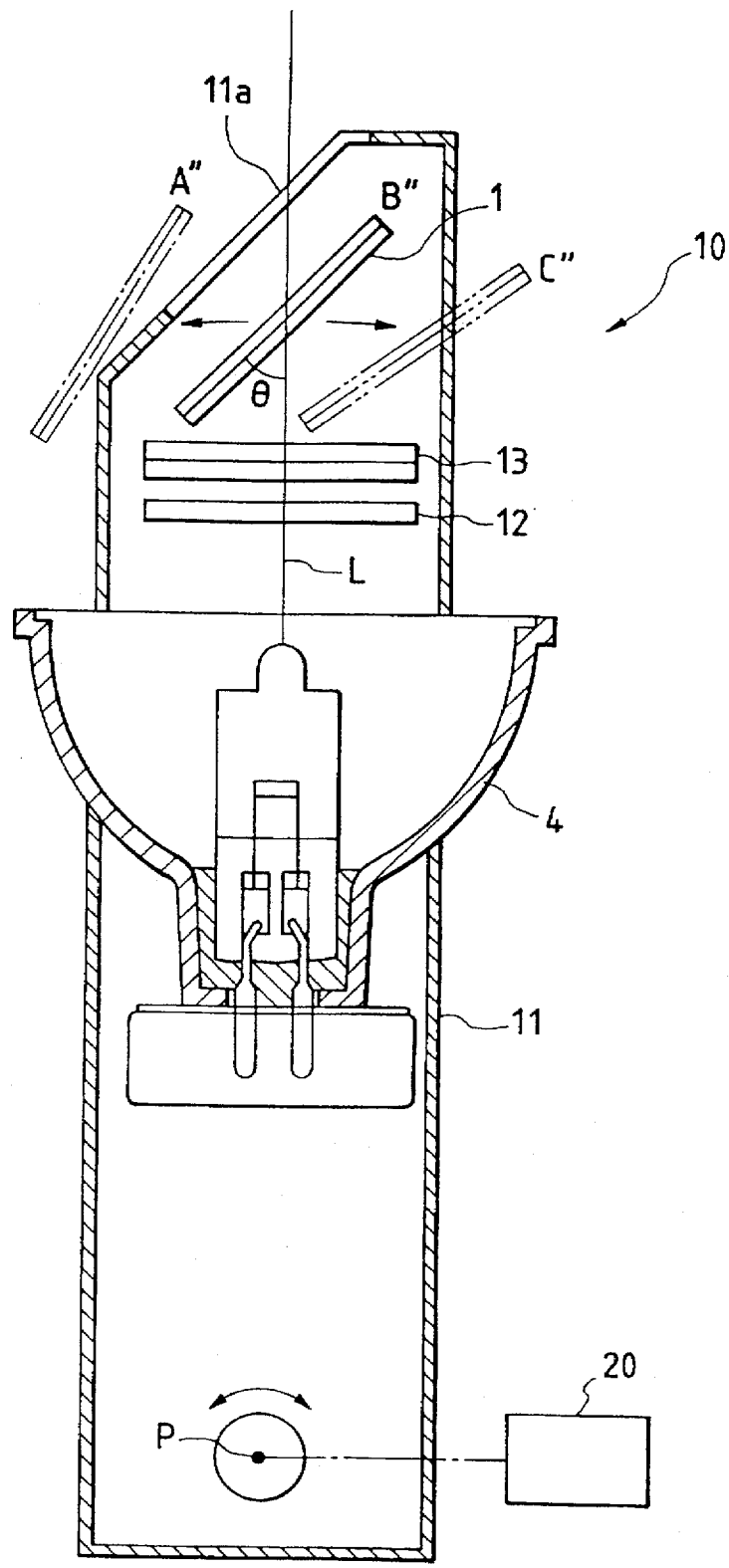
FIG. 2 is a cross-sectional view showing an arrangement of a head-up display apparatus in accordance with a second embodiment of the present invention.

FIG. 2 is a cross-sectional view showing an arrangement of a head-up display apparatus in accordance with the second embodiment of the present invention.

In FIG. 2, a main body 10 of the head-up display apparatus comprises a casing 11 in which a light source 4, a divergence plate 12, a filter 13, and a liquid crystal display 1 are sequentially disposed from rear to front. Liquid crystal display 1 serves as a display element of the present invention. Liquid crystal display 1, disposed in casing 11, has a display surface inclined at a predetermined angle θ with respect to an optical axis "L". The front end of casing 11 has an opening (or transparent portion) 11a.

Main body 10 is rotatable about a predetermined rotational center "P" located at the rear end of casing 11. Reference numeral 20 represents a driving source for rotating the main body 10 about rotational center "P". Liquid crystal display 1 causes a revolution about the rotational center "P" in accordance with rotation of main body 10. Thus, it becomes possible to obtain conditions A", B" and C" of liquid crystal display 1 similar to the conditions A, B and C shown in FIG. 1.

In this embodiment, light distribution is adequately given to allow observer 3 to visually recognize the displayed images A', B' and C' corresponding to the conditions A", B" and C" of liquid crystal display 1, respectively.

Next, an operation of the second embodiment will be explained with reference to FIG. 3, in order to demonstrate that liquid crystal display 1 of the second embodiment causes substantially the same effect as liquid crystal display 1 shown in FIG. 1.

First, liquid crystal display 1 is positioned at a condition "B" indicated by a solid line (i.e. θ1=50°, θd=50°) with respect to holographic concave mirror 2. That is, liquid crystal display 1 is disposed in the same condition as the condition "B" of FIG. 1. Liquid crystal display 1 is then rotated about the rotational center "P", so that liquid crystal display 1 substantially causes a revolution about the display center "d" of holographic concave mirror 2. Condition "A" of liquid crystal display 1, indicated by an alternate long and short dash line (i.e. θ1=52.5), is a condition where liquid crystal display 1 causes a revolution of 2°24' from the condition "B", and liquid crystal display 1 is rotated about the vertical center "e" by an amount of 10° so as to have an autorotation angle θd=60°. Condition "A" of FIG. 3 is substantially identical with the condition "A" of FIG. 1.

When liquid crystal display 1 is positioned in the condition "A", optical axis $L_A$ extending rearward from vertical center "g" of liquid crystal display 1 intersects at the rotational center "P" with optical axis $L_B$ extending from liquid crystal display 1 positioned in the condition "B".

Accordingly, by causing liquid crystal display 1 to rotate about the rotational center "P" by an amount 7°36' from the condition "B", it becomes possible to realize the condition similar to the condition of liquid crystal display 1 in the first embodiment to be obtained by both the revolution and the autorotation of liquid crystal display 1.

As explained above, the second embodiment causes liquid crystal display 1 to rotate about the rotational center "P" provided at the predetermined rear end of main body 10, so as to cause a revolution in a back-and-forth direction. Thus, with a simplified arrangement, it becomes possible to obtain enlarged images of liquid crystal display 1 free from distortion in the same manner as the first embodiment even if the viewpoint of observer 3 varies in the relatively wide range.

Third Embodiment

Next, a head-up display apparatus in accordance with the third embodiment of the present invention will be explained with reference to FIG. 4.

The third embodiment of the present invention adopts the main body 10 explained in the second embodiment for a head-up display of an automotive vehicle.

Figure 4:
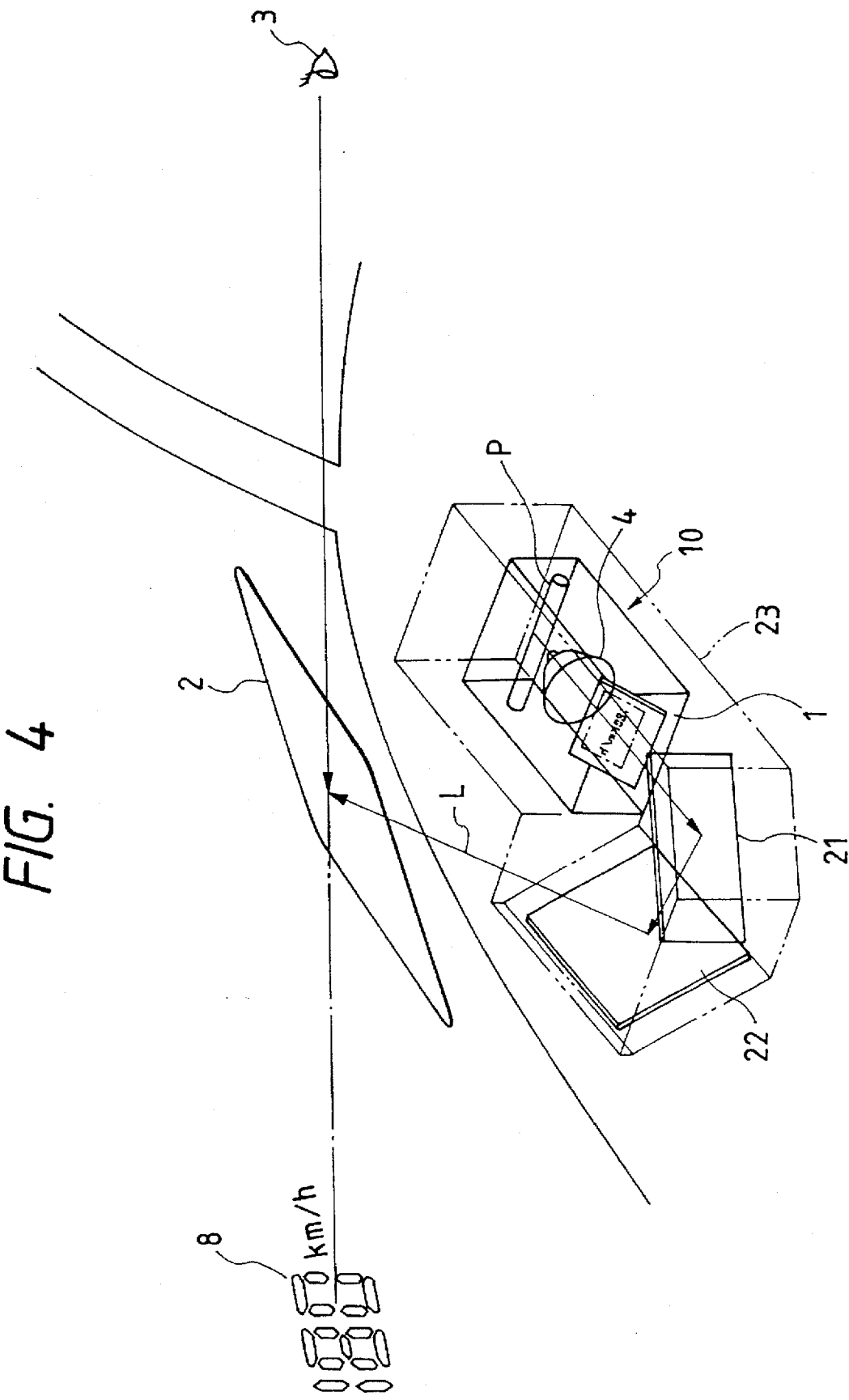
FIG. 4 is a schematic view showing an arrangement of a head-up display apparatus in accordance with a third embodiment of the present invention.
Figure 5:
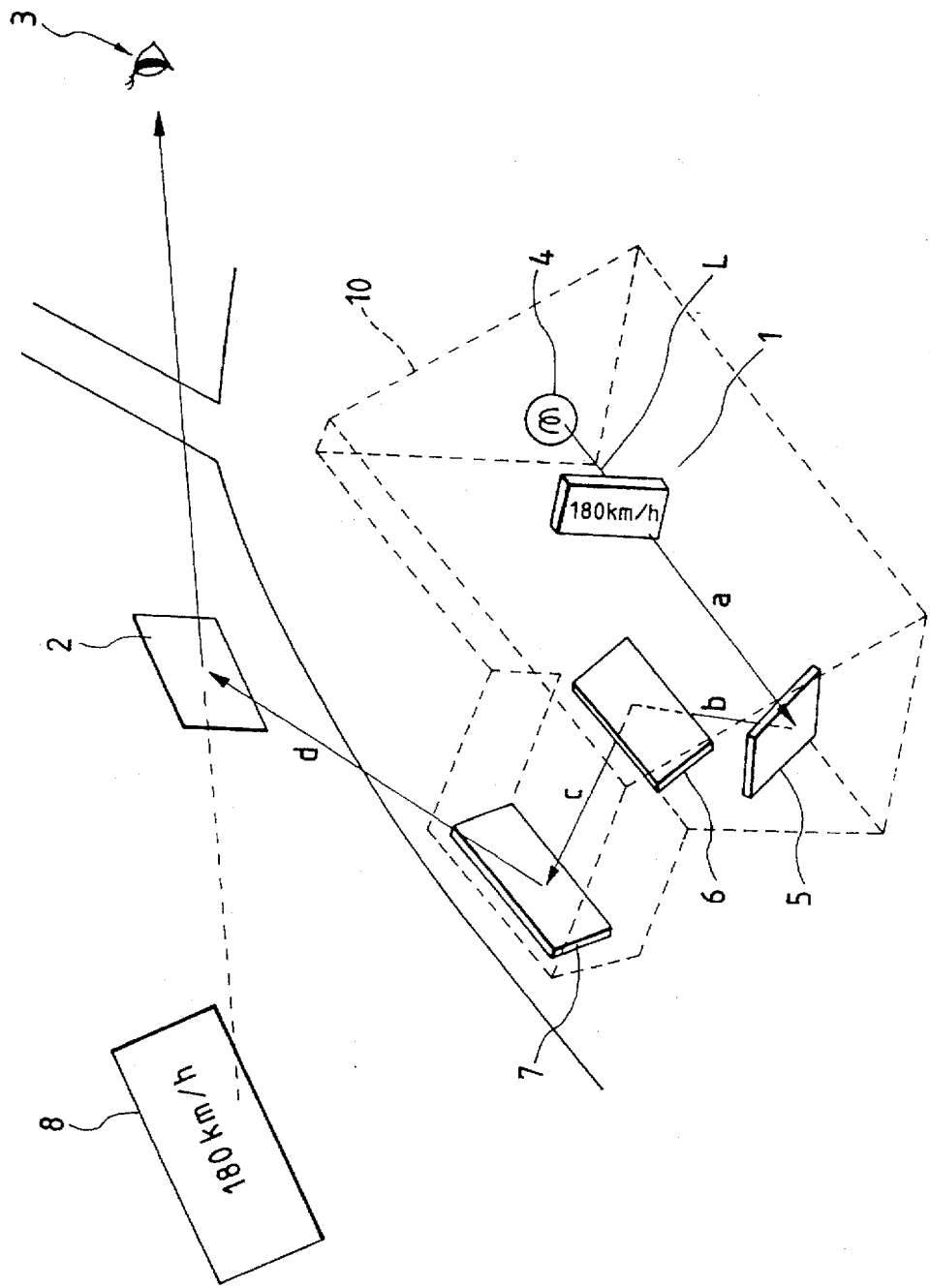
FIG. 5 is a perspective view showing a conventional head-up display apparatus.

As shown in FIG. 4, the display image of display element 1 irradiated from main body 10 is sequentially reflected by reflection plates 21 and 22 and is then projected on holographic concave mirror 2 disposed on a windshield, forming enlarged image 8 at a position ahead of windshield.

Figure 3:
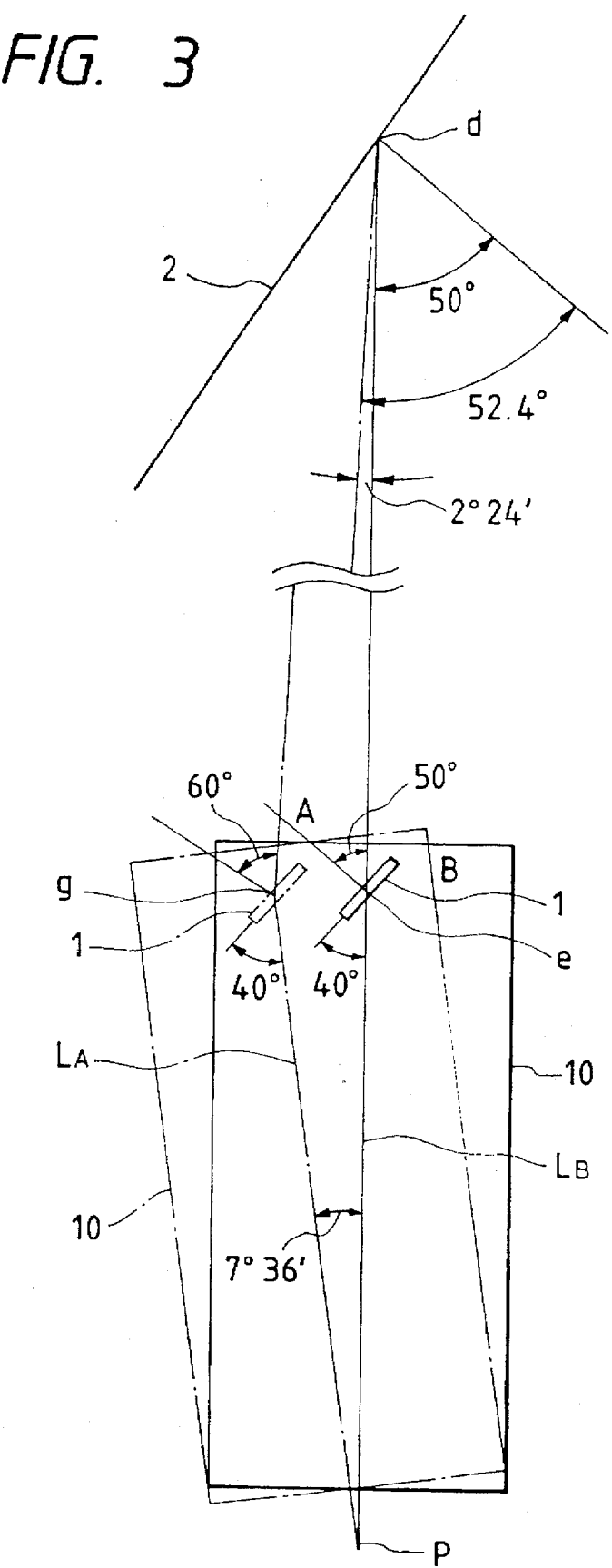
FIG. 3 is a view illustrating an operation of the head-up display apparatus in accordance with the second embodiment of the present invention.

The third embodiment is different from the second embodiment of FIG. 3 in that reflection plates 21 and 22 are provided between liquid crystal display 1 of main body 10 and holographic concave mirror 2 on the windshield so as to bent the optical axis L in a zigzag manner. However, the relationship between the specific two angles, the one angle between liquid crystal display 1 and optical axis L and the other angle between holographic concave mirror 2 and optical axis L, is substantially the same as that of the second embodiment.

Main body 10 and reflection plates 21, 22 are accommodated in casing 23 which is disposed in a predetermined place inside an instrument panel of the automotive vehicle. Main body 10 is rotatable about predetermined rotational center "P".

With this arrangement, a vacant space inside the hollow instrument panel can be effectively used to elongate the optical axis.

As shown in each of the above-described first to third embodiments, using holographic concave mirror 2 for a reflection plate of the present invention is effective to simplify the configuration of the reflection plate. Using liquid crystal display 1 for a display element of the present invention is useful to reduce the overall size of the head-up display apparatus.

As this invention may be embodied in several forms without departing from the spirit of essential characteristics thereof, the present embodiments described are therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. A head-up display apparatus comprising:

a light source for emitting light;

a display element disposed on an optical axis of said light source, for forming an image of said display element by said light emitted from said light source; and a reflection plate for enlarging said image of said display element, wherein a first angle between said optical axis and a surface of said display element is identical with a second angle between said optical axis and a surface of said reflection plate, and said display element is rotatable about a predetermined rotational center spaced from said display element, said predetermined rotational center being arranged such that said display element is located between said predetermined rotational center and said reflection plate, said rotational center being further arranged such that, within a rotational range of said display element, an intersection of said optical axis with said reflection plate remains stationary on said reflection plate.

2. A head-up display apparatus comprising:

a light source for emitting light;

a display element disposed on an optical axis of said light source, for forming an image of said display element by said light emitted from said light source; and a reflection plate for enlarging said image of said display element, wherein said display element is rotatable about a predetermined rotational center spaced from said display element, said predetermined rotational center being arranged such that said display element is located between said predetermined rotational center and said reflection plate, said rotational center being further arranged such that, within a rotational range of said display element, an intersection of said optical axis with said reflection plate remains stationary on said reflection plate.

3. The head-up display apparatus in accordance with claim 2, wherein said display element causes an autorotation in response to a revolution around said reflection plate in such a manner that a first angle increases in accordance with an increase of a second angle, where said first angle is an angle between said optical axis and a surface of said display element while said second angle is an angle between said optical axis and a surface of said reflection plate.

4. The head-up display apparatus in accordance with claim 2, wherein said reflection plate is a holographic concave mirror.

5. The head-up display apparatus in accordance with claim 2, wherein said display element is a liquid crystal display.

* * * * *